(12) United States Patent
Feld et al.

(10) Patent No.: US 7,450,607 B2
(45) Date of Patent: Nov. 11, 2008

(54) COMMUNICATION IN A DATA NETWORK

(75) Inventors: Joachim Feld, Nürnberg (DE); Günter Steindl, Poppenricht (DE); Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 613 days.

(21) Appl. No.: 10/505,740

(22) PCT Filed: Jan. 30, 2004

(86) PCT No.: PCT/EP2004/000893

§ 371 (c)(1),
(2), (4) Date: Aug. 24, 2004

(87) PCT Pub. No.: WO2004/077773

PCT Pub. Date: Sep. 10, 2004

(65) Prior Publication Data

US 2005/0117600 A1    Jun. 2, 2005

(30) Foreign Application Priority Data

Feb. 28, 2003   (DE)   ............................ 103 08 953

(51) Int. Cl.
*H04L 12/43* (2006.01)
(52) U.S. Cl. ...................... 370/458; 370/468
(58) Field of Classification Search ................ 370/462, 370/445, 347, 458, 468, 314, 389, 395.4, 370/442, 435, 446
See application file for complete search history.

(56) References Cited

U.S. PATENT DOCUMENTS

| | | | |
|---|---|---|---|
| 5,491,531 A * | 2/1996 | Adams et al. | ............... 375/354 |
| 5,771,234 A | 6/1998 | Wu et al. | |
| 5,935,214 A | 8/1999 | Stiegler et al. | |
| 6,181,687 B1 * | 1/2001 | Bisdikian | ..................... 370/347 |
| 6,483,846 B1 * | 11/2002 | Huang et al. | ................ 370/445 |

(Continued)

FOREIGN PATENT DOCUMENTS

JP        59075730 A   *   4/1984

(Continued)

OTHER PUBLICATIONS

Prof. Dr. K. Irmscher, "B-ISDN/ATM, Standardislertes Breitbandnetz, ATM Asynchronous Transfer Mode", pp. 1-28.

*Primary Examiner*—Kwang B. Yao
*Assistant Examiner*—Andrew Lai

(57) ABSTRACT

The invention relates to a method and a system for communication in a data network (101), in particular switched Ethernet, and a user (102) in such a data network (101). To reduce the communication resources required for the transmission of telegrams (119-135) in the data network (101), it is proposed that time segments are defined, which are repeated cyclically at a basic clock rate, that telegrams (119-135) are each assigned a first identifier U, which allocates to the respective telegram (119-135) a group of n successive time segments for transmission of the respective telegram (119-135), whereby the group is repeated cyclically, that the telegrams (119-135) are each assigned a second identifier Z, which allocates to the respective telegram (119-135) an mth time segment in the sequence of n time segments of a group for transmission of the respective telegram (119-135), whereby $1 \leq m \leq n$ and that the telegrams (119-135) are transmitted in the respectively assigned time segment.

10 Claims, 4 Drawing Sheets

U.S. PATENT DOCUMENTS

2003/0161217 A1* 8/2003 Rohwedder ................ 367/142
2004/0141517 A1* 7/2004 Balasubramanian et al. 370/462

FOREIGN PATENT DOCUMENTS

| JP | 63037722 A | 2/1988 |
|---|---|---|
| JP | 01286696 A | 11/1989 |
| JP | 11068848 A | 3/1999 |
| WO | 0101614 A1 * | 1/2001 |

* cited by examiner

COMMUNICATION IN A DATA NETWORK

CROSS REFERENCE TO RELATED APPLICATIONS

This application is the US National Stage of International Application No. PCT/EP04/00893, filed Jan. 30, 2004 and claims the benefit thereof. The International Application claims the benefits of German application No. 10308953.5 filed Feb. 28, 2003, both of the applications are incorporated by reference herein in their entirety.

FIELD OF INVENTION

The invention relates to a method and a system for communication in a data network, in particular switched Ethernet, and a user in such a data network.

BACKGROUND OF INVENTION

Data networks allow communication between a plurality of users by networking, i.e. connecting the individual users together. Communication thereby means the transmission of data between the users. The data to be transmitted is thereby sent in the form of data telegrams, i.e. the data is packed together in packets and sent in this form via the data network to the corresponding recipient. The term data packets is therefore also used. The term "data transmission" is totally synonymous in this document with the above-mentioned transmission of data telegrams or data packets. Networking itself is for example achieved in the case of switchable high-speed data networks, in particular the Ethernet, by inserting at least one switching matrix between two users, which is connected to both users. Each switching matrix can be connected to more than two users. Each user is connected to at least one switching matrix but not directly to another user. Users are for example computers, stored-program controllers (SPS, PLC) or further components, which exchange and in particular process electronic data with other components. Switching matrices are for example what are known as switches, hubs, bridges, routers, etc. Unlike bus systems, in which every user can access any other user of the data network directly via the data bus, switchable data networks are exclusively point-to-point connections, i.e. a user can only access all other users of the switchable network by forwarding the data to be transmitted by means of one or a plurality of switching matrices. The data packets in a switchable data network are also referred to as frames, as the useful data transmitted is generally encapsulated in a frame, as special synchronization and error-recognition bits are inserted before and after the useful data and frame it in this way.

In distributed automation systems, for example in the field of drive engineering, specific data has to reach the users for which it is intended and be processed by the recipients at specific times. This is referred to as realtime-critical data or data traffic, as failure of the data to arrive at its destination at the correct time has undesirable results for the user.

Time multiplex methods for transmitting data via broadband networks, in which time slots are reserved for different transmission channels and transmission channels are allocated to users on a temporal basis are known from the internet document by Prof. Dr. K. Irmscher, University Leipzig, "B-ISDN/ATM, Standardisiertes Breitbandnetz, ATM-Asynchroner Transfer Mode". With what is known as synchronous time multiplexing (Synchronous Time Division=STD) transmission frames are defined, which comprise a specific number of time slots of fixed size. Each user is assigned a specific time slot within the transmission frame, during which said user can send and receive. A transmission channel is therefore identified by the position of the time slot within the transmission frame.

SUMMARY OF INVENTION

The object of the invention is to reduce the communication resources required for the transmission of telegrams in a data network.

This object is achieved by a method for communication in a data network, with which method
- Time segments are defined, which are repeated cyclically at a basic clock rate,
- Telegrams are each assigned a first identifier, which allocates to the respective telegram a group of n successive time segments for transmission of the respective telegram, whereby the group is repeated cyclically,
- The telegrams are each assigned a second identifier, which allocates to the respective telegram an mth time segment in the sequence of n time segments of a group for transmission of the respective telegram, whereby $1 \leq m \leq n$ and
- The telegrams are transmitted in the respectively allocated time segment.

This object is achieved by a system for communication between users in a data network, whereby
- Users are provided for transmission of telegrams in the time segments allocated respectively to the telegrams and repeated cyclically at a basic clock rate,
- The telegrams are each assigned a first identifier, which allocates to the respective telegram a group of n successive time segments for transmission of the respective telegram, whereby the group is repeated cyclically and
- The telegrams are each assigned a second identifier, which allocates to the respective telegram an mth time segment in the sequence of n time segments of a group for transmission of the respective telegram, whereby $1 \leq m \leq n$.

This object is achieved by a user in a data network, which is provided for transmission of telegrams in the time segments allocated respectively to the telegrams and repeated cyclically at a basic clock rate, whereby the telegrams are each assigned a first identifier, which allocates to the respective telegram a group of n successive time segments for transmission of the respective telegram, whereby the group is repeated cyclically and whereby the telegrams are each assigned a second identifier, which allocates to the respective telegram an mth time segment in the sequence of n time segments of a group for transmission of the respective telegram, whereby $1 \leq m \leq n$.

The invention is based on the knowledge that coordination of the transmission of telegrams between users in a data network allows such communication also to be used in the realtime environment. In a standard network, e.g. with access control based on CSMA/CD (Carrier Sense Multiple Access/Collision Detection) all users have equal priority with regard to sending messages, i.e. the individual users select times for sending messages completely independently of each other. However this means that the delays until the sending operation has actually been completed cannot be defined with a fixed upper limit. This restricts the use of such a network in a deterministic communication environment. In a network, in which users exchange data in a statistically distributed manner in respect of time and communication partner, a specific network load would perhaps be established, which can be clearly defined. However if a cyclical n:1 relationship exists, as is usually the case in realtime environments, (i.e. n users send cyclically to one user), an uncontrollable overload can repeatedly result for the recipients on receipt as a result of beats in the n send cycles due to uncoordinated sending. This can result in telegram losses, which have an adverse effect on data transmission quality. If the upper limit of the receive interval is correspondingly high, this situation can be controlled. This is however always associated with a very high level of resources both in the network and in the recipient. The coordination as proposed here of telegram send times prevents overload peaks for the recipient user. The distribution of send times over time means that a calculable and feasible upper limit can be specified for the number of telegrams to be processed in the recipient user. Communication availability thereby increases, as the probability of a telegram loss is minimized. The load on the data network is more predictable and the possibility of using the communication proposed here, particularly in the realtime environment and automation technology, is therefore improved.

According to one advantageous embodiment of the invention the telegrams each have a third identifier, which is used to determine the sequence of the telegrams transmitted within a time segment. The telegrams are thereby each assigned a unique place in the sequence of telegrams in a time segment, which allows further optimization of telegram traffic coordination.

In order to allow the transmission of time uncritical data, which for example has no identifiers, within the data network, according to a further advantageous embodiment of the invention, it is proposed that a first domain be provided within a time segment for the transmission of realtime data and a second domain for the transmission of other data.

The invention is described in more detail below with reference to the exemplary embodiments shown in the Figures.

DETAILED DESCRIPTION OF INVENTION

Figure 1:
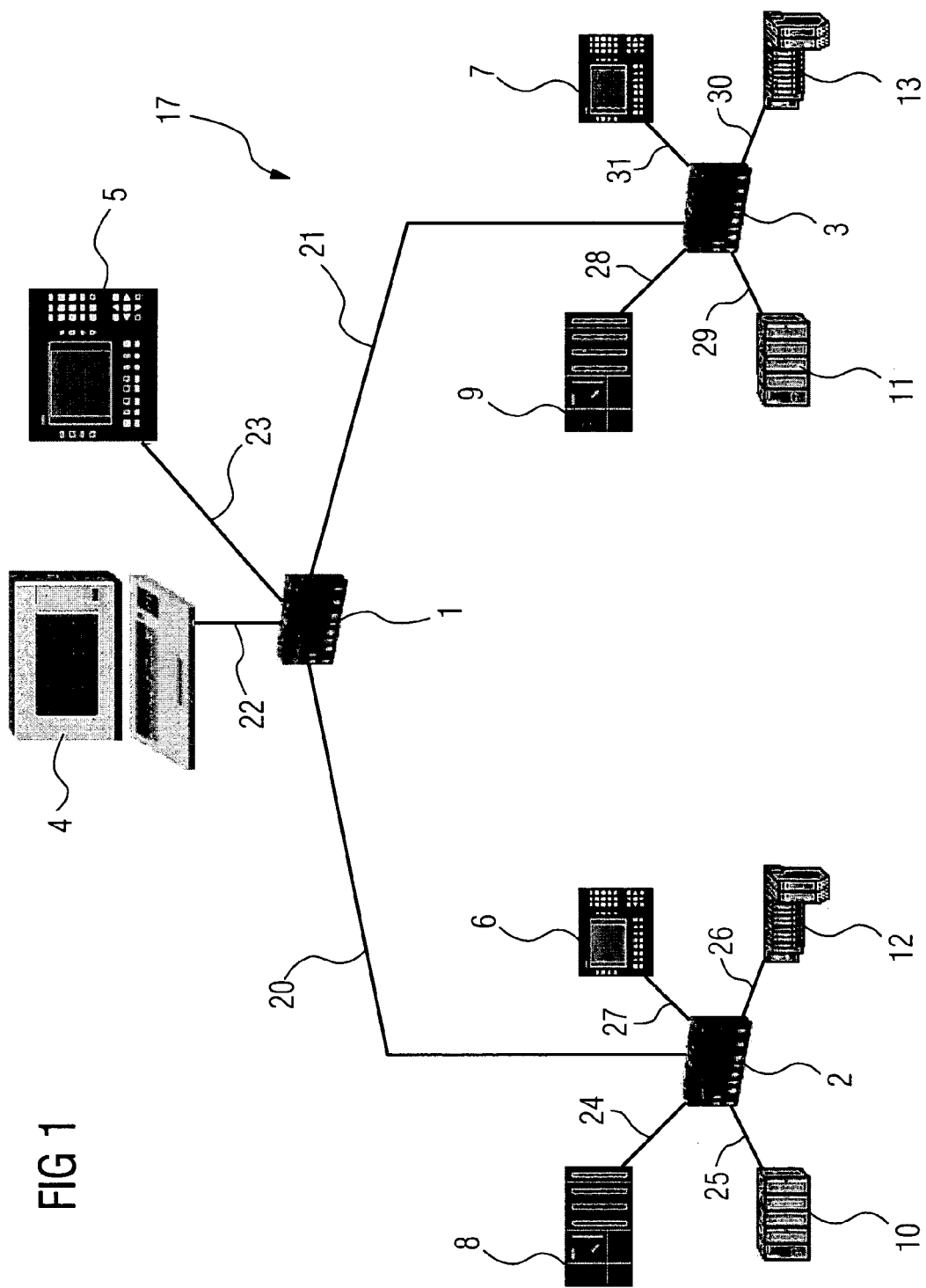
FIG. 1 shows different users in a switchable data network.

FIG. 1 shows a switchable data network 17 with users 1 to 13. The users 1-13 are linked together by means of point-to-point communication connections 20-31. In the exemplary embodiment shown in FIG. 1 the switchable data network 17, e.g. a switched Ethernet network, is used for the communication of components in an automation system. The ussers 4-13 in the automation system are linked together via switching elements 1-3 to forward data packets transmitted via the communication connections 20-30. Connected by means of a point-to-point connection 20-30 to the switching elements 1-3 are a mobile programming device 4, a central control and monitoring system 5, standalone control and monitoring stations 6, 7, stored-program controllers 8, 9, input/output units 10, 11 and further peripheral modules 12, 13. Communication between the users 4-13 in the automation system is therefore effected not directly, e.g. via what is known as a shared medium network, but in the switchable data network 17, in each instance via one or a plurality of switching elements 1-3. The complex tasks to be carried out by the automation system, some of them with very stringent requirements with regard to the realtime capability of the system, require deterministic communication by the users 1-13 in the automation system.

Figure 2:
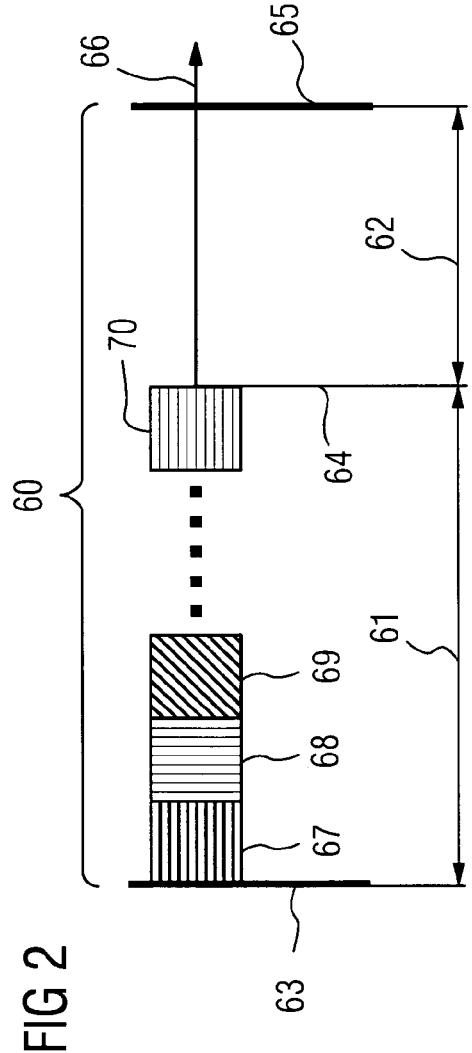
FIG. 2 shows telegrams during a transmission cycle in a data network.

FIG. 2 shows telegrams 67-70 during a transmission cycle 60 in a data network. The time axis of the diagram in FIG. 2 is identified with the reference character 66. The transmission cycle 60 has a beginning 63 and an end 65. The transmission cycle 60 is repeated cyclically at what is known as a basic clock rate. The basic clock rate of the transmission cycle 60 in the exemplary embodiment is an integer multiple of 31.25 µs, in this case the $2^5$-th, i.e. 32 times the basic clock rate of 31.25 µs. This gives a basic clock rate of 1 ms. The transmission cycle, also referred to as a time segment, has a first domain 61 for the transmission of realtime data and a second domain 62 for the transmission of other data. The boundary between the two domains 61 and 62 is identified with the reference character 64. In the exemplary embodiment the transmission cycle 60 is used 50% for the transmission of realtime data and a further 50% for the transmission of other data. This corresponds to 50% bandwidth use for realtime data. As in the data network 17 according to FIG. 1 all the sending users 1-13 control the sending of telegrams 67-70 using a send list according to the proposed method, when considering the bandwidth used by the receiving users 1-13, the telegrams 67-70 to be received must be totaled in a cumulative manner. The telegrams 67 are transmitted cyclically at the basic clock rate of 1 ms, the telegrams 68-70 are transmitted cyclically at an integer multiple of the period of the basic clock rate, in particular cyclically at a clock rate with a period resulting from the product of a power of two and the basic clock rate. In the example the telegrams 68 are transmitted at a clock rate of 2 ms, the telegrams 69 at a clock rate of 4 ms and finally the telegrams 70 at a clock rate of 1024 ms. The telegrams 68 are therefore only transmitted in every second transmission cycle 60 at the basic clock rate of 1 ms, the telegrams 69 correspondingly in every fourth transmission cycle 60 and the telegrams 70 in every $1024^{th}$ transmission cycle 60.

Figure 3:
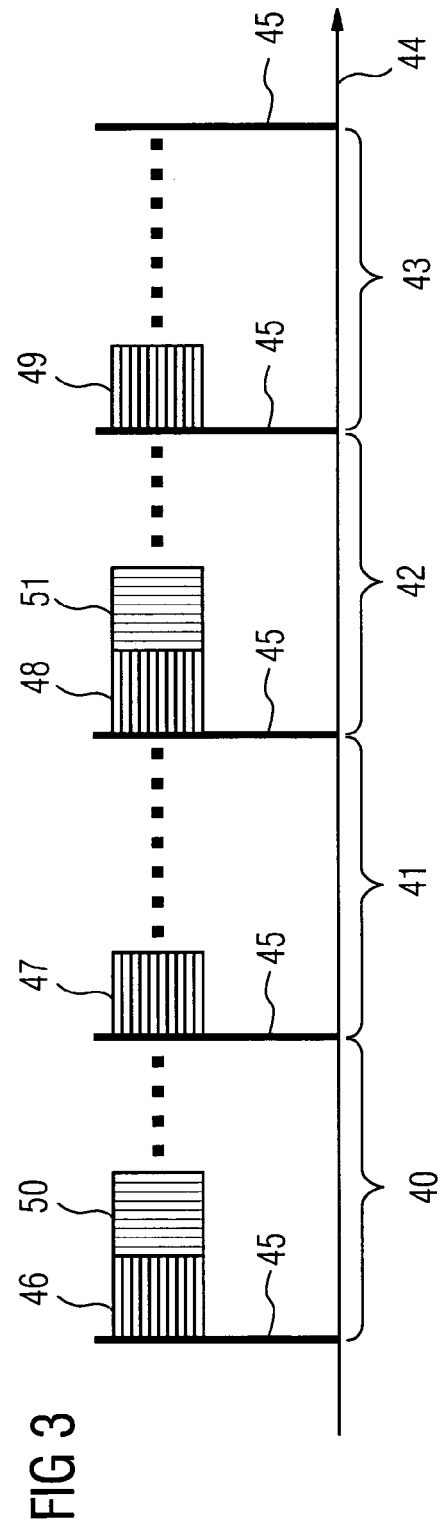
FIG. 3 shows a sequence of transmission cycles with cyclically transmitted telegrams.

To clarify the principle of the invention FIG. 3 shows a sequence of transmission cycles 40-43 with cyclically transmitted telegrams 46-51. Users in a data network, e.g. automation devices in an automation system, cannot or do not all have to communicate with the same high performance level. So that the slowest user does not determine the capacity of the entire data network, what is known as a stepping down operation is carried out. This stepping down operation is defined as a factor at the lowest clock rate. Stepping down allows communication relationships to be qualified when there is a plurality of users (e.g. as fast and slow communication relationships) and thereby allows a high level of update data for communication with selected communication partners, even when there is a plurality of users. The diagram in FIG. 3 identifies the time arrow with the reference character 44, the limits of the transmission cycles 40-43 respectively with the reference character 45. Each of the transmission cycles 40-43 comprises a period of 1 ms, i.e. the transmission cycles 40-43 follow each other at the basic clock rate. The telegrams 46-49 are updated cyclically at said basic clock rate of 1 ms. However the telegrams 50, 51 are stepped down to the value "2", i.e. with a factor 2 in respect of the lowest basic clock rate. The telegrams 50, 51 are therefore updated every 2 ms, in this case in the transmission cycles 40 and 42. Every transmission cycle 40-43 at the basic clock rate of 1 ms represents a time segment. Depending on the scaling down factor selected, one or a plurality of time segments are available for the transmission of telegrams 46-51. In the example in FIG. 3 precisely two different time segments are available. The telegrams 46-51 to be sent, also referred to as frames, can be distributed to the individual time segments, i.e. to the transmission cycles 40-43, for optimum use of the bandwidth. The cyclical transmission of the telegrams 50, 51 with a stepping down factor of "2" could therefore also be transmitted cyclically here in the unused time segments, i.e. in the transmission cycles 41, 43. If there is a plurality of telegram types with the same update rate, i.e. the same stepping down factor, these can thereby be distributed to the time segments for better use of the bandwidth.

Figure 4:
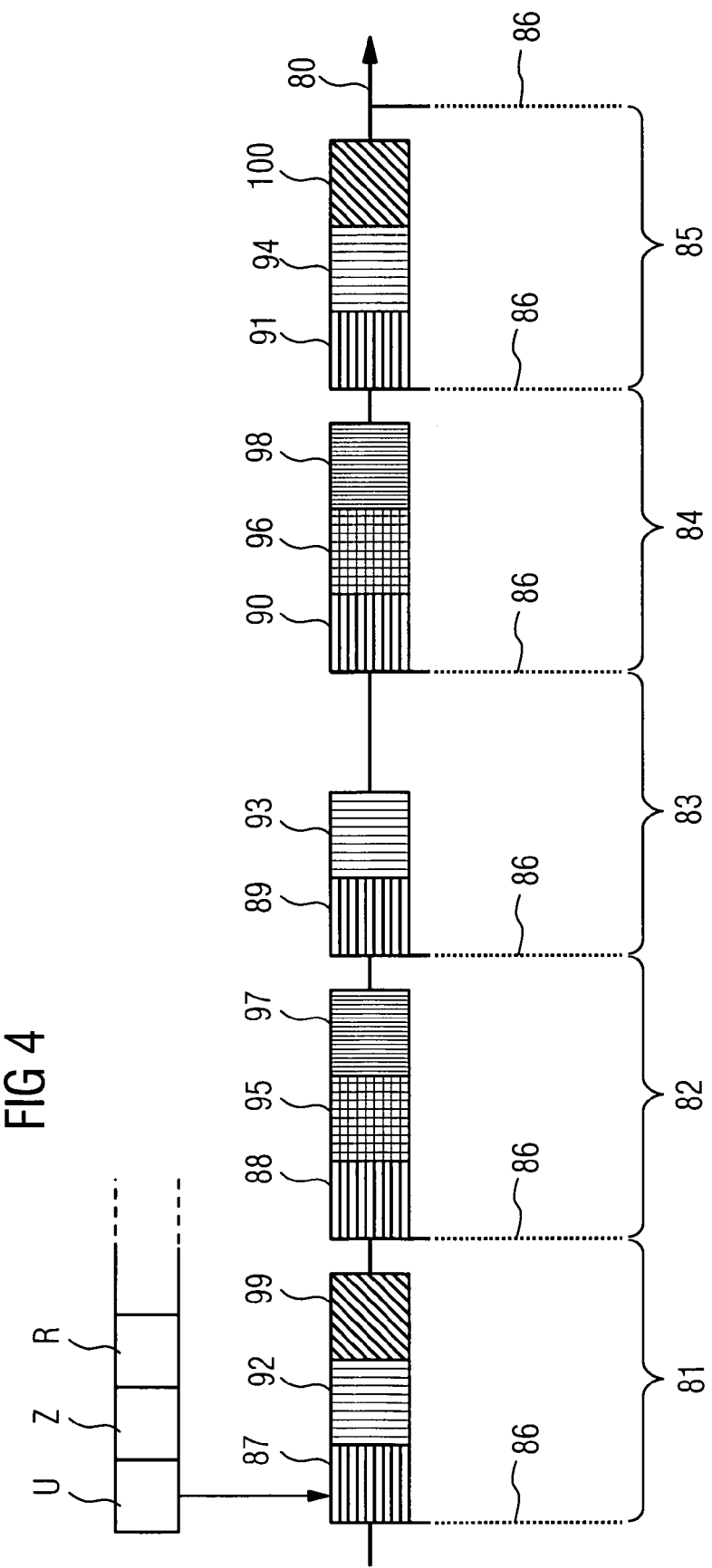
FIG. 4 shows a sequence of transmission cycles for the transmission of telegrams with different identifiers.

FIG. 4 shows the sequence of transmission cycles 81-85 for the transmission of telegrams 87-100 with different identifiers. The time arrow in the diagram is identified with the reference character 80, the limits of the transmission cycles 81-85 are identified with the reference character 86. Once the telegrams to be sent have been assigned to time segments, additional optimization is possible, if the sequence of the telegrams within a time segment is also predefined. In particular the sequence of the telegrams, to which the same stepping down factor is allocated, is mutually predefined. In this case the telegrams with a higher update rate, i.e. a lower stepping down factor, have priority over telegrams with a higher stepping down factor and are therefore transmitted before these. In the example a user sends telegrams 87-100 cyclically to five other users respectively. The basic clock rate of the transmission cycles 81-85 in turn has a period of 1 ms. The stepping down factor, time segment and sequence for transmission of the telegrams 87-100 are determined for each of the five transmission links. For the transmission link, on which telegrams 87-91 are transmitted between two users, a stepping down factor with the value "1", a time segment with the value "1" and a sequence with the value "1" are determined.

For the transmission link to a further user, on which telegrams 92-94 are transmitted, a stepping down factor with the value "2", a time segment with the value "1" and a sequence with the value "2" are determined. For the transmission link to a third user, on which telegrams 95-96 are transmitted, a stepping down factor with the value "2" is also determined, but here the time segment is determined as 2 and the sequence with the value "1". Also for transmission of the telegrams 97, 98 to a fourth user a stepping down factor with the value "2" is determined and a time segment with the value "2" but here the sequence is determined at the value "2". Finally the telegrams 99, 100 are transmitted to a fifth user. For this transmission link the stepping. down factor is determined as 4, a time segment with the value "1", and a sequence with the value "3". The stepping down factor is identified as the first identifier U, the time segment as the second identifier Z. Therefore the telegrams 87-100 are assigned a first identifier U, the stepping down factor, which allocates to the respective telegram 87-100 a group of n successive time segments or transmission cycles 81-85 for transmission of the respective telegram 87-100, whereby the group is repeated cyclically. The telegrams are also assigned second identifier Z, the time segment, which allocates to the respective telegram 87-100 an mth time segment in the sequence of n time segments of a group for transmission of the respective telegram 87-100, whereby 1<m<n. m und n are natural numbers. Also in the exemplary embodiment in FIG. 4 the telegrams 87-100 are assigned a third identifier R, which is used to determine a sequence of the telegrams 87-100 transmitted within a time segment. The identifiers U, Z, R can thereby be assigned to the telegrams 87-100 themselves (shown in principle in FIG. 4 using the example of the telegram 87), e.g. as part of the telegram content, but can also be assigned to the respective transmission links between users in a data network. Telegrams, which are transmitted via transmission links with corresponding identifiers U, Z, R, are thereby transmitted as a function of said identifiers U, Z, R. The coordinated transmission as described here of telegrams 87-100, also referred to as send list control, results in more uniform distribution of the telegrams 87-100 to the individual time segments or transmission cycles 81-85, and thereby to better utilization of the available bandwidth.

Figure 5:
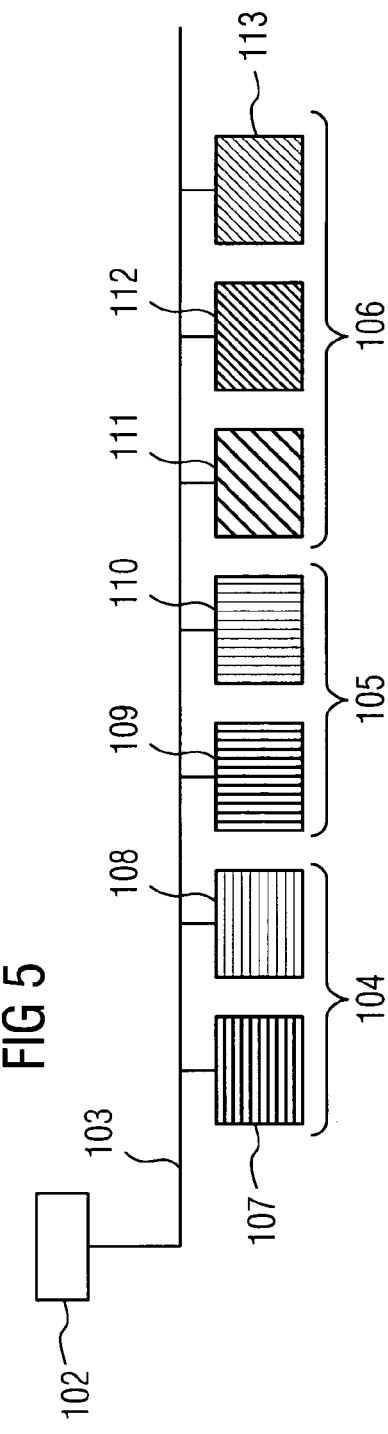
FIG. 5 shows a data network with communicating users and FIG. 6 shows a schematic illustration of the telegrams exchanged between said users.

FIG. 5 shows a data network 101 with communicating users 102, 107-113. The user 102 thereby sends telegrams via the connecting links 103 to the further users 107-113. The connecting links 103 are configured as a switched network in the exemplary embodiment. The transmission of telegrams to the users 107 and 108, identified together with the reference character 104, takes place at the basic clock rate of 1 ms, i.e. with a stepping down factor with the value "1". The users 109 and 110 identified with the reference character 105 respectively receive telegrams from the sending user 102 in a cycle with a period of 2 ms, i.e. with a stepping down factor with the value "2". The third group of users 111-113 identified with the reference character 106 finally receives telegrams from the sending user 102 every 4 ms, i.e. a stepping down factor with the value "4" is assigned to said telegrams or the transmission links to the users 111-113.

Figure 6:
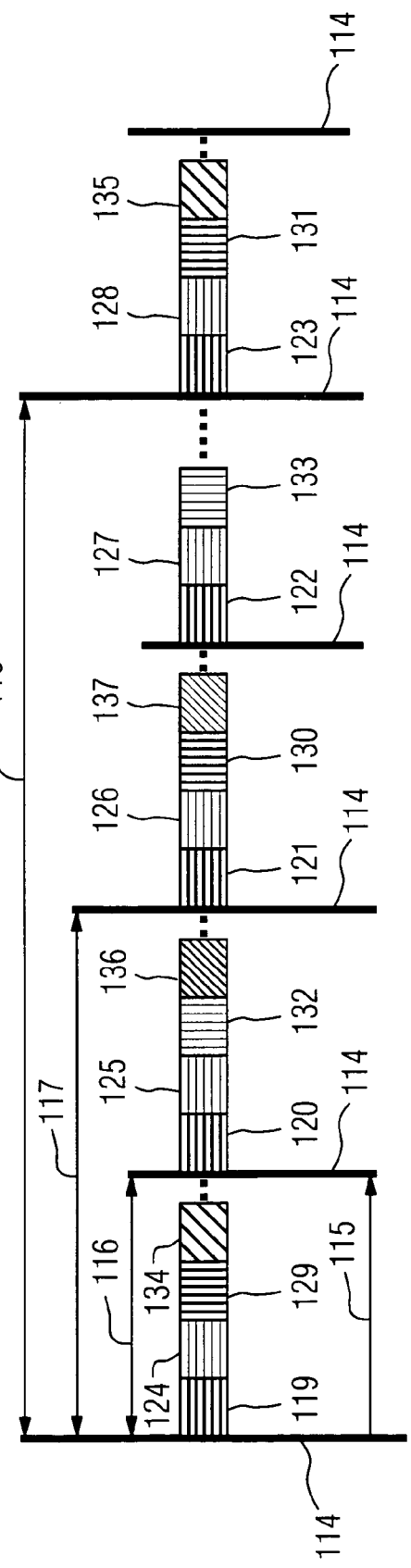

FIG. 6 shows a schematic illustration of the telegrams 119-135 exchanged between the users 102 or 107-113 shown in FIG. 5. The respective limits of the transmission cycles are identified with the reference character 114. The basic clock rate 115 of 1 ms results with a selected stepping down factor with the value "1" in the smallest possible group of n successive time segments or transmission cycles, the extent of which is identified with the reference character 116. In this case n=1. In the case of a selected stepping down factor with the value "2", a further group of n successive time segments results, the extent of which is identified with the reference character 117. In this case the value n=2. The extent of a third group, characterized by a stepping down factor with the value "4" and therefore n=4 successive time segments, is identified by the reference character 118. Assigning the identifiers U, Z, R to the telegrams 119-135 sent by the user 102 to the users 107-113 results for any selected time segment of the communication in the distribution of the telegrams 119-135 shown in FIG. 6. The telegrams 119-123 are transmitted in a 1 ms cycle to the user 107. The telegrams 124-128 are transmitted to the user 108 with the same repetition rate, i.e. also stepped down with the value "1", however these telegrams 124-128 are assigned a third identifier R, which has the value "2" here. The second group with users 109 or 110 receives telegrams 129-131 or 132-133 respectively every 2 ms from the sending user 102. Finally telegrams 134 and 135, 136 or 137 are transmitted to the third group 106 with users 111, 112 and 113 every 4 ms.

The user 102 thereby sends telegrams cyclically to the seven further users 107-113 respectively. The stepping down factors U, the time segment Z and the sequence R are determined in the form of a send list as follows:

User 107: U=1, Z=1, R=1
User 108: U=1, Z=1, R=2
User 109: U=2, Z=1, R=1
User 110: U=2, Z=2, R=1
User 111: U=4, Z=1, R=1
User 112: U=4, Z=2, R=1
User 113: U=4, Z=3, R=1

With this exemplary embodiment in FIGS. 5 and 6 it can also be clearly seen that the proposed method for communication in a data network results in a very good temporal distribution of telegrams 119-135 and therefore to very good use of the available bandwidth.

To summarize, the invention therefore relates to a method and a system for communication in a data network 101, in particular switched Ethernet, and a user 102 in such a data network 101. In order to reduce the communication resources required for the transmission of telegrams 119-135 in the data network 101, it is proposed that time segments are defined, which are repeated cyclically at a basic clock rate, that telegrams 119-135 are each assigned a first identifier U, which allocates to the respective telegram 119-135 a group of n successive time segments for transmission of the respective telegram 119-135, whereby the group is repeated cyclically, that the telegrams are each assigned a second identifier Z, which allocates to the respective telegram 119-135 an mth time segment in the sequence of the n time segments of a group for transmission of the respective telegram 119-135, whereby $1 \leq m \leq n$, and that the telegrams 119-135 are transmitted in the respectively allocated time segment.

The invention claimed is:

1. A method for communication in a data network, comprising:
   defining time segments, which are repeated cyclically at a basic clock rate;
   assigning a first identifier to each of a plurality of telegrams that allocates to each telegram a group of n successive time segments for transmission of the telegram, wherein the group is repeated cyclically;
   allocating to each telegram an $m^{th}$ time segment in the sequence of the n time segments of a group for transmission of the telegram, whereby $1 \leq m \leq n$, wherein the allocated $m^{th}$ time segment is based on a second identifier assigned to the telegram; and
   transmitting each of the telegrams entirely in the respectively allocated time segment.

2. The method according to claim 1, further comprising:
   assigning a third identifier to the telegrams in each case, wherein the third identifier is used to determine a sequence of the telegrams to be transmitted within a time segment.

3. The method according to claim 1, wherein a first domain is provided within a time segment for transmission of realtime data and wherein a second domain is provided for transmission of other data.

4. The method according to claim 2, wherein a first domain is provided within a time segment for transmission of realtime data and wherein a second domain is provided for transmission of other data.

5. A system for communication between users in a data network, composing:
   users for transmitting telegrams, wherein time segments are assigned to each of the telegrams and wherein the time segments are repeated at a basic clock rate, wherein
   the telegrams are each assigned a first identifier, which allocates to the respective telegram a group of n successive time segments for transmission of the respective telegram, whereby the group is repeated cyclically, and wherein
   the telegrams are each assigned a second identifier, which second identifier is used to allocates to the respective telegram an $m^{th}$ time segment in the sequence of the n time segments of a group for transmission of the respective telegram, whereby $1 \leq m \leq n$ such that each of the telegrams is transmitted entirely in the respectively allocated time segment.

6. The system according to claim 5, wherein the telegrams are each assigned a third identifier, which is used to determine a sequence of the telegrams to be transmitted within a time segment.

7. The system according to claim 5, wherein a first domain is provided within a time segment for transmission of realtime data and wherein a second domain is provided for transmission of other data.

8. The system according to claim 6, wherein a first domain is provided within a time segment for transmission of realtime data and wherein a second domain is provided for transmission of other data.

9. A user in a data network, wherein
   the user is adapted for transmitting telegrams in time segments allocated respectively to the telegrams and repeated cyclically at a basic clock rate, wherein
   the telegrams are each assigned a first identifier, which allocates to the respective telegram a group of n successive time segments for transmitting the respective telegram, whereby the group is repeated cyclically and wherein
   the telegrams are each assigned a second identifier, which second identifier is used to allocates to the respective telegram an $m_{th}$ time segment in the sequence of the n time segments of a group for transmission of the respective telegram, whereby $1 \leq m \leq n$ such that each of the telegrams is transmitted entirely in the repectively allocated time segment.

10. The user according to claim 9, wherein the user is a computer, a PLC or a component which exchanges data with an other component.

* * * * *